(12) United States Patent
Abrahamian et al.

(10) Patent No.: US 11,902,308 B2
(45) Date of Patent: Feb. 13, 2024

(54) DETECTING THREAT PATHWAYS USING SEQUENCE GRAPHS

(71) Applicant: AT&T Intellectual Property I, L.P., Atlanta, GA (US)

(72) Inventors: Edmond Abrahamian, Richmond Heights, MO (US); Maisam Shahid Wasti, Union City, CA (US); Andrew Campbell, Pleasant Hill, CA (US); Ana Armenta, San Jose, CA (US); Prince Paulraj, Coppell, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 323 days.

(21) Appl. No.: 17/338,646

(22) Filed: Jun. 3, 2021

(65) Prior Publication Data
US 2022/0394049 A1    Dec. 8, 2022

(51) Int. Cl.
*H04L 29/06*    (2006.01)
*G06N 20/00*    (2019.01)
*G06F 40/134*   (2020.01)
*H04L 9/40*     (2022.01)

(52) U.S. Cl.
CPC ........ *H04L 63/1425* (2013.01); *G06F 40/134* (2020.01); *G06N 20/00* (2019.01); *H04L 63/08* (2013.01); *H04L 63/10* (2013.01); *H04L 63/1491* (2013.01); *H04L 2463/082* (2013.01)

(58) Field of Classification Search
CPC ..... H04L 63/1425; H04L 63/08; H04L 63/10; H04L 63/1491; H04L 2463/082; H04L 63/0236; H04L 63/1433; G06F 40/134; G06N 20/00
See application file for complete search history.

(56) References Cited

U.S. PATENT DOCUMENTS

| | | | |
|---|---|---|---|
| 2017/0063910 A1* | 3/2017 | Muddu ................. | G06F 3/0482 |
| 2019/0132344 A1* | 5/2019 | Lem ....................... | G06N 20/00 |
| 2020/0057946 A1* | 2/2020 | Singaraju ............... | G06N 5/025 |

(Continued)

OTHER PUBLICATIONS

Akoglu, Leman, and Christos Faloutsos. "What Is Strange in Large Networks? Graph-Based Irregularity and Fraud Detection, Part III: Graph-Based Spam/Fraud Detection Algorithms and Apps." Carnegie Melon Computing Services, IEEE ICDM International Conference on Data Mining, Dec. 10, 2012.

(Continued)

*Primary Examiner* — Joseph P Hirl
*Assistant Examiner* — Thomas A Gyorfi

(57) ABSTRACT

A method for detecting threat pathways using sequence graphs includes constructing a sequence graph from a set of data containing information about activities in a telecommunications service provider network, where the sequence graph represents a subset of the activities that occurs as a sequence, providing an embedding of the sequence graph as input to a machine learning model, wherein the machine learning model has been trained to detect when an input embedding of a sequence graph is likely to indicate a threat activity, determining, based on an output of the machine learning model, whether the subset of the activities is indicative of the threat activity, and initiating a remedial action to mitigate the threat activity.

20 Claims, 7 Drawing Sheets

(56) References Cited

U.S. PATENT DOCUMENTS

2020/0104401 A1* 4/2020 Burnett ................ G06F 16/287

OTHER PUBLICATIONS

Chakravorty, Saurav. "Graphs Analytics for Fraud Detection." Medium, Towards Data Science, Nov. 6, 2019.
Magomedov, Shamil, et al. "Anomaly Detection with Machine Learning—Thesai.org." The Science and Information (SAI) Organization Limited, (IJACSA) International Journal of Advanced Computer Science and Applications, vol. 9, No. 11, Dec. 19, 2018.
Noble, Caleb C., and Diane J. Cook. "Graph-Based Anomaly Detection: Proceedings of the Ninth ACM SIGKDD International Conference on Knowledge Discovery and Data Mining." ACM Conferences, SIGKDD '03, Aug. 24, 2003.
Hodler, Amy E. "Financial Fraud Detection with Graph Data Science: Identifying Fraud Rings." Neo4j®, May 4, 2020.
Pourhabibi, Tahereh, et al. "Fraud Detection: A Systematic Literature Review of Graph-Based Anomaly Detection Approaches." Decision Support Systems, North-Holland, Apr. 17, 2020.
Safe-Graph. "Safe-Graph/Graph-Fraud-Detection-Papers: A Curated List of Fraud Detection Papers Using Graph Information or Graph Neural Networks." GitHub.

* cited by examiner

DETECTING THREAT PATHWAYS USING SEQUENCE GRAPHS

The present disclosure relates generally to data security, and relates more particularly to devices, non-transitory computer-readable media, and methods for detecting threat pathways using sequence graphs.

BACKGROUND

Fraud costs consumers billions of dollars each year, collectively. Moreover, an individual victim of fraud may spend much time trying to repair the non-financial damage of the fraud, such as replacing credentials and equipment, resetting access to accounts, and the like. For instance, a consumer may receive an email, a phone call, or even an in-person solicitation from a person claiming to have some legitimate need for the user's financial information such as a credit card number. If the person is not who he claims to be, however, the consumer may end up having to pay for purchases he did not make or authorize. The consumer may also spend a great deal of time and effort disputing fraudulent charges assessed against his credit card, obtaining a new credit card with a new credit card number, and updating the credit card number on the consumer's accounts that are automatically charged to the credit card.

SUMMARY

The present disclosure broadly discloses methods, computer-readable media, and systems for detecting threat pathways using sequence graphs. In one example, a method performed by a processing system includes constructing a sequence graph from a set of data containing information about activities in a telecommunications service provider network, where the sequence graph represents a subset of the activities that occurs as a sequence, providing an embedding of the sequence graph as input to a machine learning model, wherein the machine learning model has been trained to detect when an input embedding of a sequence graph is likely to indicate a threat activity, determining, based on an output of the machine learning model, whether the subset of the activities is indicative of the threat activity, and initiating a remedial action to mitigate the threat activity.

In another example, a non-transitory computer-readable medium may store instructions which, when executed by a processing system in a communications network, cause the processing system to perform operations. The operations may include constructing a sequence graph from a set of data containing information about activities in a telecommunications service provider network, where the sequence graph represents a subset of the activities that occurs as a sequence, providing an embedding of the sequence graph as input to a machine learning model, wherein the machine learning model has been trained to detect when an input embedding of a sequence graph is likely to indicate a threat activity, determining, based on an output of the machine learning model, whether the subset of the activities is indicative of the threat activity, and initiating a remedial action to mitigate the threat activity.

In another example, a device may include a processing system including at least one processor and a non-transitory computer-readable medium storing instructions which, when executed by the processing system when deployed in a communications network, cause the processing system to perform operations. The operations may include constructing a sequence graph from a set of data containing information about activities in a telecommunications service provider network, where the sequence graph represents a subset of the activities that occurs as a sequence, providing an embedding of the sequence graph as input to a machine learning model, wherein the machine learning model has been trained to detect when an input embedding of a sequence graph is likely to indicate a threat activity, determining, based on an output of the machine learning model, whether the subset of the activities is indicative of the threat activity, and initiating a remedial action to mitigate the threat activity.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
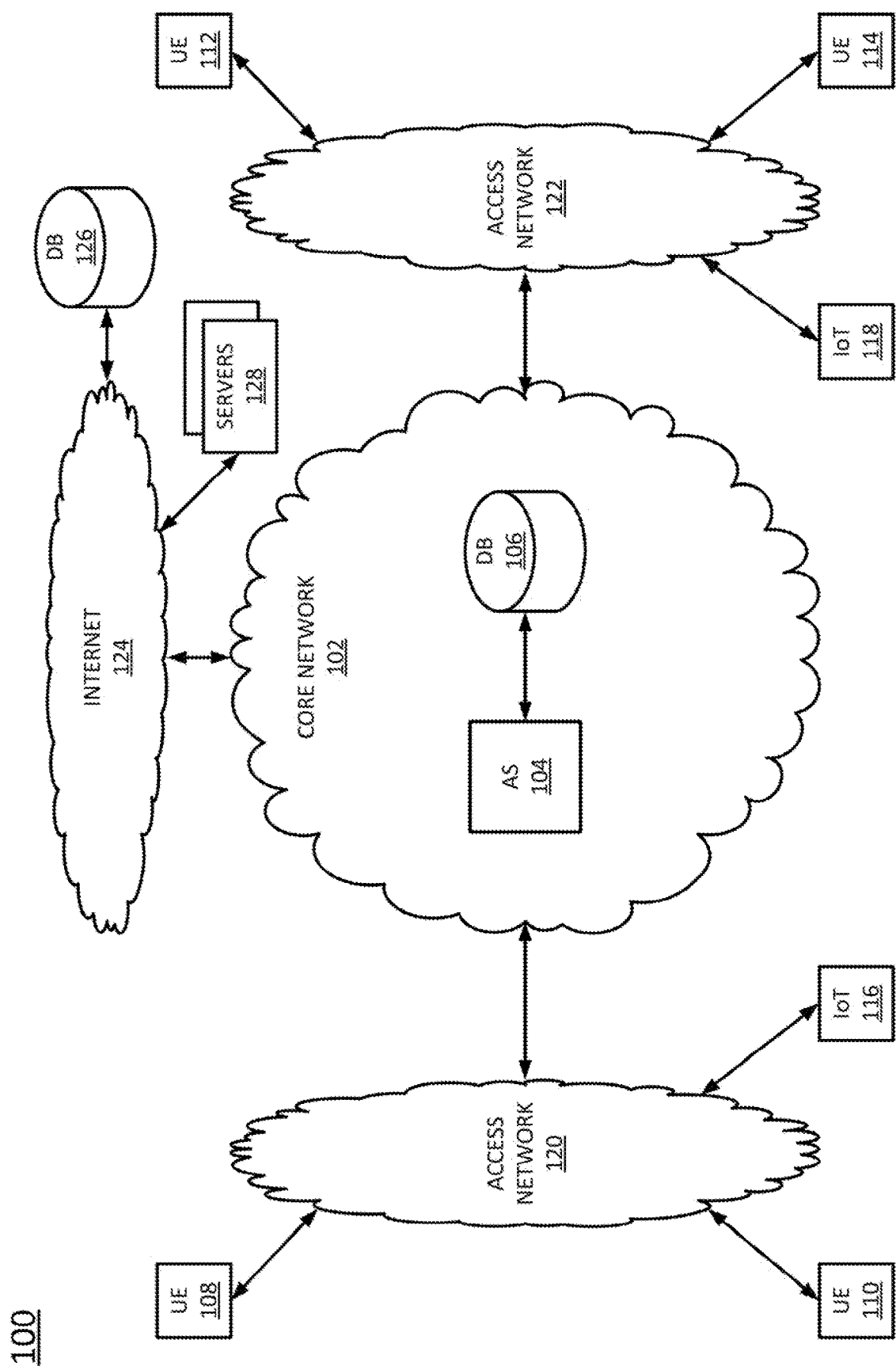
FIG. 1 illustrates an example system in which examples of the present disclosure for detecting threat pathways using sequence graphs may operate.

The present disclosure broadly discloses methods, computer-readable media, and systems for detecting threat pathways using sequence graphs. As discussed above, fraud costs consumers billions of dollars each year, collectively. Moreover, an individual victim of fraud may spend much time trying to repair the non-financial damage of the fraud, such as replacing credentials and equipment, resetting access to accounts, and the like. The individuals perpetrating the fraud will often discover some vulnerable pathway through which to commit fraud and will continue to exploit this pathway until the pathway is discovered and measures are taken to mitigate the vulnerabilities. Sometimes, these individuals will work together, inflicting potentially greater losses on consumers and businesses.

Most existing fraud detection techniques are geared more toward investigation than to discovery. That is, although such techniques may be effective at detecting fraudulent activities that have already been perpetrated at a large scale, these techniques may be less adept at detecting such fraudulent activities earlier on, e.g., before the fraudulent activities have had the opportunity to inflict more significant damage. This initial time to detect (TTD) is crucial, since many perpetrators of fraud employ a "flooding" strategy in which, after carefully confirming a vulnerability, resources are mobilized to flood the vulnerability with fraudulent transactions in order to maximize the damage before the vulnerability can be detected and mitigated.

Moreover, fraud detection techniques that rely on machine learning to detect new instances of fraud are prone to a high rate of false positives. With traditional machine learning techniques, a set of features is typically used to create a model (where the features may comprise creditworthiness, nature of purchase, total value of shopping cart, and/or other features). The machine learning model is also provided with the outcomes (e.g., fraud or not fraud) of the feature sets, so that the machine learning model can be trained to determine the likelihood of fraud for a new set of features.

However, fraud tends to constitute a number in the low single digits as a percentage of total transactions. Typically, only the first few top percentiles of a machine learning model's threshold values are practically in use (e.g., areas where the lift is high, and the dividends are high for more fraud cases); thus, a large number of false positives (e.g., sets of features that are identified as potentially fraudulent but are not fraudulent) may be generated. This is particularly a problem in cases where no automatic mitigation measures are implemented. In such cases, a fraud model may score transactions (where the score indicates a likelihood of fraud), and then the transactions whose scores exceed a threshold may be sent to human analysts for further analysis and mitigating actions. Thus, having to review large numbers of false positives diverts the analysts' attention from instances of actual fraud and may delay the implementation of actions to mitigate the instances of actual fraud. For this reason, it is desirable for machine learning-based fraud detection models to have the greatest lift and precision possible in the first few top percentiles.

Examples of the present disclosure utilize sequence graphs to identify activity sequences that have a high propensity for being implicated in threat (e.g., fraud) activity, as well as to identify relationships among the activity sequences. Thus, likelihood of threat is predicted based upon the sequence of activities that an entity has performed or experienced, rather than on a set of features of a transaction. The proposed approach requires more data for the purposes of training than conventional machine learning-based techniques; however, the accuracy of the proposed approach is greater, leading to a greater number of instances of detected threats with fewer false positives. In further examples, the disclosed approach may also alert analysts to newly observed behaviors (anomalies), which may help to target new rules against the newly observed behaviors.

The disclosed approach is adept at identifying well-known threat pathways, as well as new threat pathways and vulnerabilities. In one example, the present disclosure looks for anomalies in the sequence graphs which may be indicative of emerging threats, e.g., fraudulent activities or other activities which may endanger data, but that have not yet been perpetrated at a large scale. Detecting these emerging threats may enable mitigating measures to be implemented sooner. When mitigating measures are able to be enacted sooner, the losses incurred as a result of the threat activity can be minimized. Thus, examples of the present disclosure may reduce the time to detect outbreaks of threat activity and the time to mitigate the outbreaks.

Although examples of the disclosure are discussed within the context of fraud (e.g., when an unauthorized user gains access to an individual's resources, e.g., a subscriber account, for a service and attempts to exploit the access to the financial detriment of the individual), the approaches disclosed herein are well suited to facilitating early detection of various types of threats, including network intrusions, unauthorized access to a resource, e.g., a database or a piece of equipment such as a computerized system, network equipment failures, broken links on web sites, files that are vulnerable to unauthorized accesses and the like. These and other aspects of the present disclosure are discussed in greater detail below in connection with the examples of FIGS. 1-7.

Within the context of the present disclosure, a "graph" is understood to refer to a data structure $G=(V, E)$, where a directed complete simple graph G may include a vertex set V and an edge set E, and each edge $e \in E$ has an associated weight (or cost)$\in R$. Consider $V=\{1, 2, \ldots, n\}$, where $n=|V|$, and each vertex $v \in V$ has an associated weight $\in R^+$. Consider also V[A] and E[A], respectively, as subsets of vertices and edges induced by a structure A. A cycle C of size t is a subgraph of G, such that vertices V[C] form a sequence of distinct vertices $v_1, \ldots v_t$, and edge $(v_i, v_{(i \bmod t)+1}) \in E[C]$ for all $1 \le i \le t$. It is noted that, by this definition, a cycle of size two is a simple edge. A cycle of size one (without edges) may be referred to as an "empty cycle."

A "sequence graph" is understood to refer to a graph that represents a series of activities. The graph representation may vary depending upon the desired outcome. For instance, a sequence graph may represent a series of activities in which each node of the sequence graph represents one activity in the series, or the sequence graph may represent a time series in which each node represents the state of some entity (e.g., an account of a telecommunications network service subscriber) as the state changes with time. In another example, a sequence graph may comprise a multi-partite graph (i.e., a graph in which nodes belong to different sets of properties, such as a combination of account state transitions and account properties).

A "multi-partite graph" is understood to refer to a graph in which V can be partitioned into k independent sets. For example, within the context of the present disclosure, a graph may comprise a plurality of nodes representing subscriber accounts, called telephone numbers, people, and the like. Thus, the vertices of the graph may represent different entities, and the edges of the graph may represent relationships among those different entities.

To further aid in understanding the present disclosure, FIG. 1 illustrates an example system 100 in which examples of the present disclosure for detecting threat pathways using sequence graphs may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104 and at least one database (DBs) 106. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114 and the AS 104, between the user endpoint devices 108, 110, 112, 114, the Internet of Things (IoT) devices 116 and 118, and the AS 104, other components of the core network 102, devices reachable via the Internet in general, and so forth.

In one example, each of the user endpoint devices 108, 110, 112, and 114 may comprise any single device or combination of devices that may comprise a user endpoint device. For example, the user endpoint devices 108, 110, 112, and 114 may each comprise a mobile device, a cellular smart phone, a gaming console, a set top box, a laptop computer, a tablet computer, a desktop computer, a wearable smart device (e.g., a smart watch, smart glasses, or a fitness tracker) an application server, a bank or cluster of such devices, and the like.

The access networks 120 and 122 may also be in communication with one or more Internet of Things (IoT) devices 116 and 118, respectively. The IoT devices 116 and 118 may comprise wired or wireless devices that are installed in a user's home or business. The IoT devices 116 and 118 may be controlled, via a controller, a mobile device, a computer, or the like, to control one or more systems in the user's home or business. For instance, the IoT devices 116 and 118 may comprise alarm systems, smart thermostats, doorbells including cameras, smart lighting systems, virtual assistants, smart audio systems, and/or other types of devices.

Figure 7:
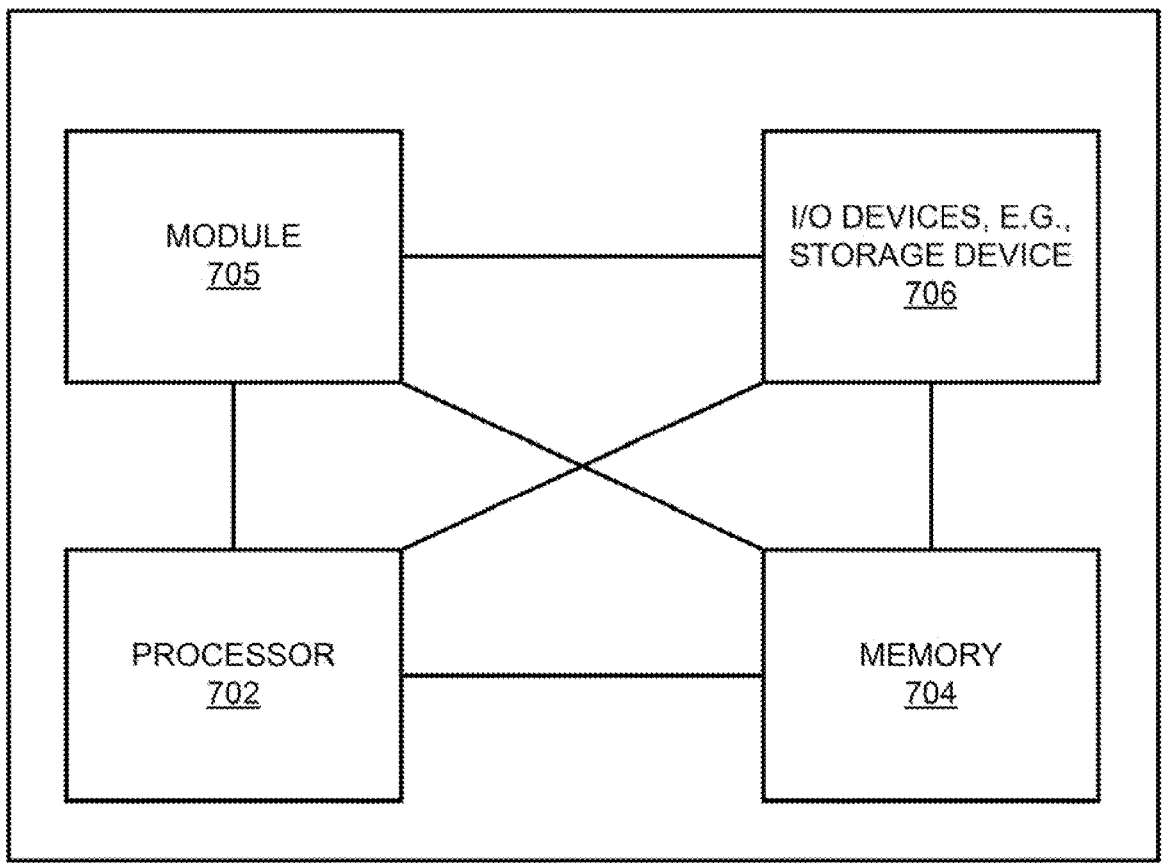
FIG. 7 illustrates an example of a computing device, or computing system, specifically programmed to perform the steps, functions, blocks, and/or operations described herein.

In accordance with the present disclosure, the AS 104 may be configured to provide one or more operations or functions in connection with examples of the present disclosure for detecting threat pathways using sequence graphs, as described herein. The AS 104 may comprise one or more physical devices, e.g., one or more computing systems or servers, such as computing system 700 depicted in FIG. 7, and may be configured as described below to detect threat pathways using sequence graphs. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 7 and discussed below) or multiple computing devices collectively configured to perform various steps, functions, and/or operations in accordance with the present disclosure.

In one example, the AS 104 may be configured to detect threat pathways using sequence graphs. As discussed above, many instances of threat activity may follow known pathways that exploit known vulnerabilities. Still other instances of threat activity may exploit previously unknown vulnerabilities to generate new or emerging threat pathways. The AS 104 may collect data about network activities from various sources, including the Internet 124, servers 128, user endpoint devices 108, 110, 112, or 114, IoT devices 116 or 118, and other sources in the core network 102 and access networks 120 and 122 (including devices which are not illustrated), and may construct sequence graphs based on this collected data, where the sequence graphs may represent various transactions occurring in the network 100. For instance, in one example, a sequence graph may illustrate a series of states that a subscriber account of a telecommunications network service provider subscriber goes through over a window of time (e.g., logins, logouts, changes to settings and subscriptions, etc.). In another example, a sequence graph may illustrate the hops (i.e., devices and/or links) traversed by a network packet, the system and device accesses made by an unauthorized individual who has managed to access a specific file, or the links clinked by a user during a session with a web site.

As discussed in further detail below, the AS 104 may train a machine learning model (e.g., a neural network model) using training sequence graphs that represent historical network activities. In one example, the training may be unsupervised, and graph embeddings may be generated from the training sequence graphs and clustered together based in similarities. In another example, the training may be supervised, and each training sequence graph may be labeled to indicate whether the associated transaction or sequence of activities results in a threat or non-threat outcome. One specific example of a method for training a machine learning model to detect threat pathways using sequence graphs according to the present disclosure is described in greater detail in connection with FIG. 2.

Furthermore, the AS 104 may utilize a trained machine learning model in order to analyze a sequence graph representing a new transaction or sequence of activities. The trained machine learning model may generate an output which the AS 104 may analyze in order to determine whether the new transaction or sequence of activities is indicative of threat activity. The output may comprise, for instance, the identification of an anomaly in a sequence of activities or a likelihood (e.g., numerical probability) that the sequence of activities will result in a threat (e.g., fraud being perpetrated). Based on the output of the machine learning model, the AS 104 may initiate a remedial action, such as sending an instruction to a device to take some action (e.g., lock access to a subscriber account, send a code for two-factor authentication, re-route network packets to a "honeypot," block access to specific ports, blacklist specific IP addresses, issue work orders, or alert human analysts for further review).

The DB 106 may store sequence graphs representing historical transactions or sequences of activities in the network 100. For instance, each entry in a database 106 may comprise a sequence graph that represents at least one transaction or series of activities associated with an entity in the network (where the entity may be a device, a user, or another entity). As discussed in further detail below, each sequence graph may comprise a uni-partite sequence graph, a multi-partite sequence graph, or a sequence graph including cycles. Each sequence graph may further be associated with either a graph embedding that embeds the sequence graph in a lower dimensional space (for unsupervised training of the machine learning model) or a label that indicates whether an outcome of the represented transaction or sequence of activities was a threat or was not a threat (for supervised training of the machine learning model).

In a further example, the DB 106 may store a set of rules that specify the remedial actions to be taken when activities on certain threat pathways are detected. For instance, each sequence graph that is associated with a known threat outcome may be associated with one or more specific remedial actions that the AS 104 may initiate. As an example, if a sequence graph represents an instance in which multiple unsuccessful attempts are made to log into a subscriber account, associated remedial actions may include locking access to the subscriber account, sending a code for two-factor authentication to the individual associated with the subscriber account, suspending a service to the subscriber account, or the like. Where an anomaly is detected that indicates a potential network intrusion, associated remedial actions may include blocking access to certain ports (e.g., ports which may be vulnerable to compromise), blacklisting certain IP addresses (e.g., IP addresses associated with suspected sources of intrusion), or re-routing network packets to a honeypot.

In one example, the DB 106 may comprise a physical storage device integrated with the AS 104 (e.g., a database server or a file server), or may be attached or coupled to the AS 104, in accordance with the present disclosure. In one example, the AS 104 may load instructions into a memory, or one or more distributed memory units, and execute the instructions for detecting threat pathways using sequence graphs, as described herein.

In one example, one or more servers 128 and databases (DBs) 126 may be accessible to the AS 104 via Internet 124 in general. The servers 128 may include Web servers that support physical data interchange with other devices connected to the World Wide Web. For instance, the Web servers may support Web sites for Internet content providers, such as social media providers, ecommerce providers, service providers, news organizations, and the like. At least some of these Web sites may include sites via which users may be exposed to fraud or compromise (e.g., unauthorized account or file access, and the like).

In one example, the databases 126 may store sequence graphs representing historical transactions or sequences of activities in the network 100 and/or rules for initiating remedial actions in response to suspected threat activities. For instance, the databases 126 may contain information that is similar to the information contained in the DB 106, described above.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 and IoT devices 116 and 118 may communicate with the core network 102 via different access networks, and so forth. Thus, these and other modifications are all contemplated within the scope of the present disclosure.

Figure 2:
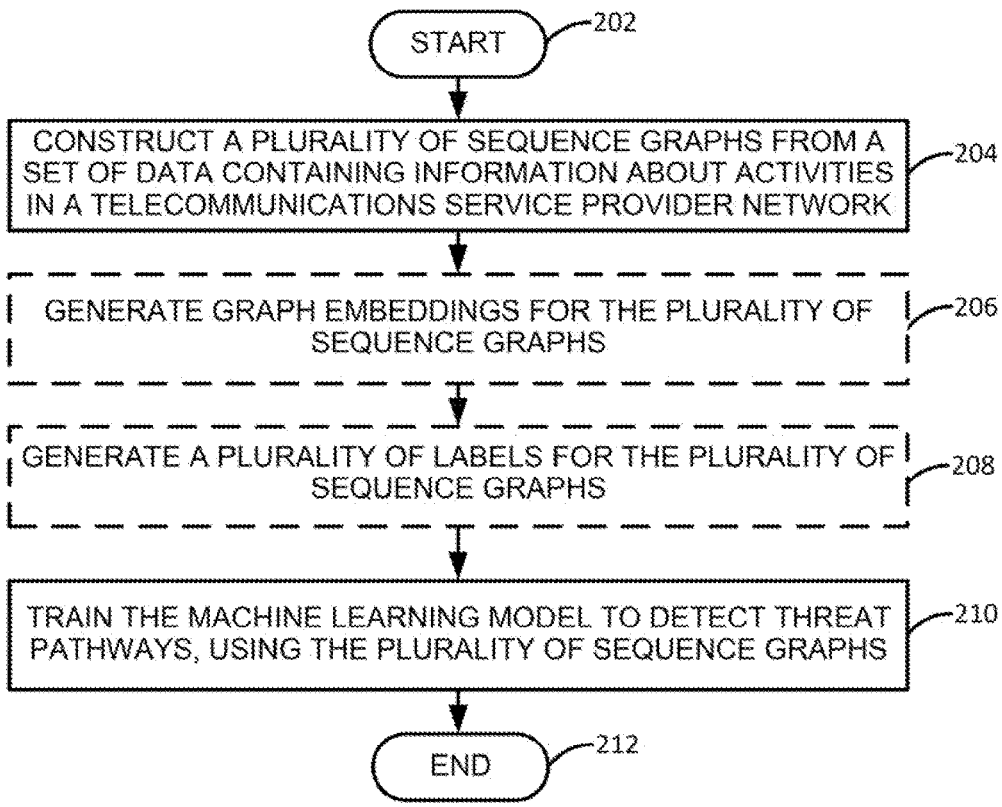
FIG. 2 illustrates a flowchart of an example method for detecting threat pathways using sequence graphs, in accordance with the present disclosure.

FIG. 2 illustrates a flowchart of an example method 200 for detecting threat pathways using sequence graphs, in accordance with the present disclosure. Specifically, the method 200 comprises a method for training a machine learning model to predict when a sequence of activities is likely to culminate in a threat (e.g., to a user, to the network, to a device, to a file, etc.). In one example, steps, functions and/or operations of the method 200 may be performed by a device as illustrated in FIG. 1, e.g., AS 104 or any one or more components thereof. In one example, the steps, functions, or operations of the method 200 may be performed by a computing device or system 700, and/or a processing system 702 as described in connection with FIG. 7 below. For instance, the computing device 700 may represent at least a portion of the AS 104 in accordance with the present disclosure. For illustrative purposes, the method 200 is described in greater detail below in connection with an example performed by a processing system, such as processing system 702.

The method 200 begins in step 202 and proceeds to step 204. In step 204, the processing system may construct a plurality of sequence graphs from a set of data containing information about activities in a telecommunications service provider network. For instance, the activities may comprise communications or transactions occurring between two or more devices in the telecommunications service provider network (e.g., between a domain name system (DNS) server and a gateway, between a web server and a user endpoint device, between a database and a user endpoint device, etc.).

In another example, the plurality of sequence graphs may be constructed from a set of data containing information about activities of a group of individuals. For example, the group of individuals comprises a plurality of subscribers of a telecommunications network service provider. However, in other examples, the group of individuals could comprise another group of individuals. For instance, the group of individuals could comprise a plurality of customers of a bank, a plurality of users of a social media or e-commerce web site, or the like.

In one example, each sequence graph in the plurality of sequence graphs may comprise a subset of the activities which are related (e.g., as part of a common transaction) and arranged in sequential order. Activities may be determined to be related, for instance, where the activities involve the same user (e.g., as identified by a user ID, an account number, an account login, an email address, a mobile phone number, or the like), the same device (e.g., as identified by IP address, mobile subscriber number, or the like), or some other common parameters. For instance, a series of clicks on a web site, where each of the clicks originates with the same device within some defined window of time (e.g., x minutes), may represent a single user session that can be represented as a sequence graph.

Figure 3:
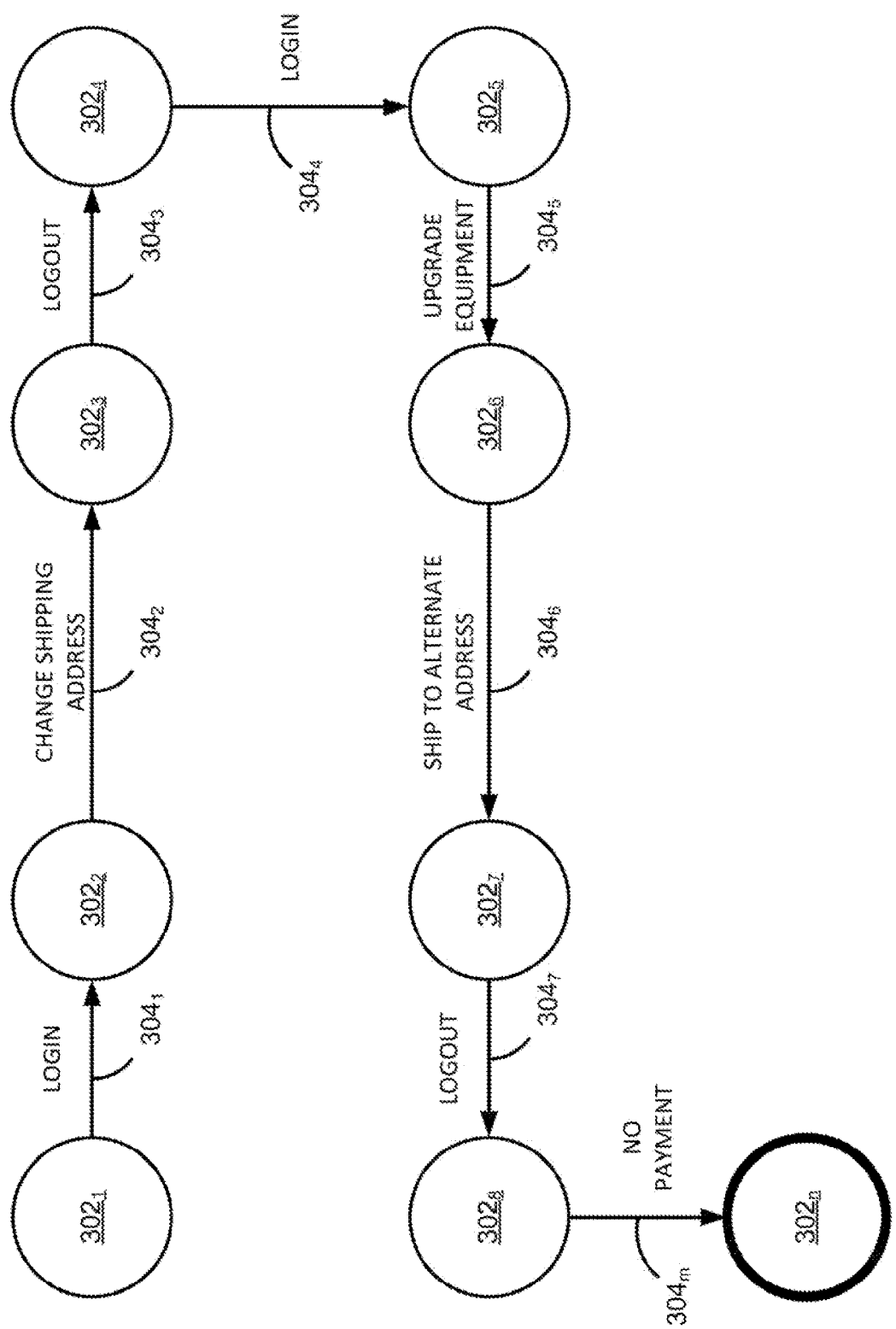
FIG. 3 illustrates an example sequence graph that may be constructed to represent a series of activities.

FIG. 3, for instance, illustrates an example sequence graph 300 that may be constructed to represent a series of activities. As illustrated, the sequence graph 300 comprises a plurality of nodes $302_1$-$302_n$ (hereinafter individually referred to as a "node 302" or collectively referred to as "nodes 302") and a plurality of edges $304_1$-$304_m$ (hereinafter individually referred to as an "edge 304" or collectively referred to as "edges 304") connecting the plurality of nodes 302. Each node 302 may represent a state of an entity (e.g., a subscriber account), while each edge 304 may represent an action that causes the entity to transition from one state to the next. Each edge 304 may be directed to indicate the order in which the transition occurs.

In the example of FIG. 3, the sequence graph 300 represents a time series. In this case, the nodes 302 represent states of a subscriber account associated with a subscriber of a telecommunications network service provider at different points in time, and the edges represent actions such as a user logging into the subscriber account, a user changing a shipping address associated with the subscriber account, a user upgrading equipment associated with the subscriber account, and the like. More specifically, the sequence of activities represented by the sequence graph 300 comprises: (1) a user logs into a subscriber account (edge $304_1$); (2) a user changes the shipping address associated with the subscriber account (edge $304_2$); (3) a user logs out of the subscriber account (edge $304_3$); (4) a user logs back into the subscriber account (edge $304_4$); (5) a user upgrades equipment associated with the subscriber account (edge $304_5$); (6) a user has the upgraded equipment shipped to an alternate address (e.g., an address other than a primary address associated with the subscriber account; edge $304_6$); (7) a user logs out of the subscriber account (edge $304_7$); and (8) the upgraded equipment is not paid for (edge $304_m$). The fact that the last node of the sequence graph 300, i.e., node $302_n$, is outlined in bold indicates that the sequence graph 300 culminates in a state that is likely to indicate fraud (e.g., an unauthorized user has gained access to a subscriber account and used the access to purchase equipment). In other words, the bolded outline indicates the state at which fraud was identified in the sequence of activities.

Figure 4:
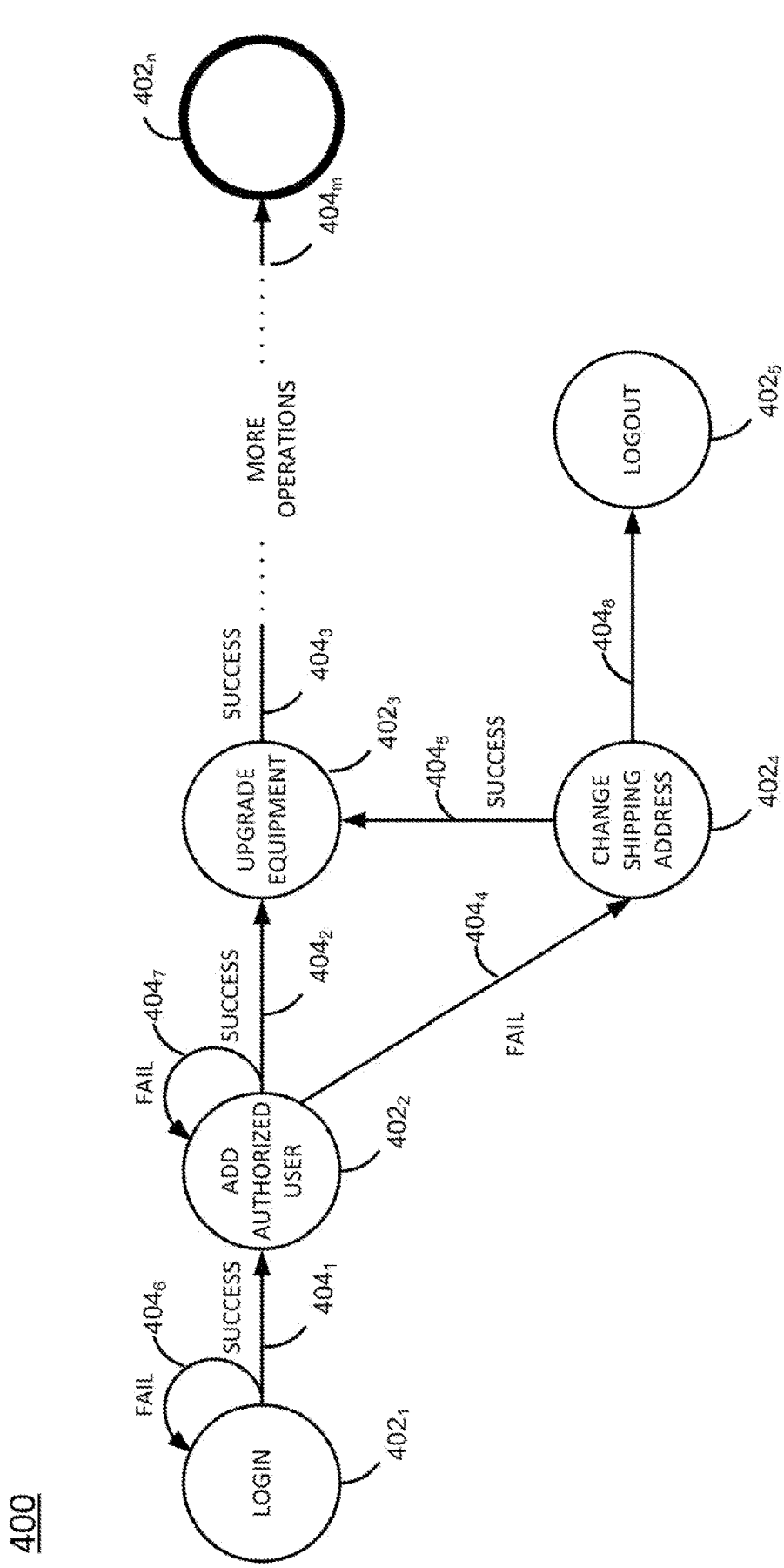
FIG. 4 illustrates an example sequence graph that includes cycles.

The sequence graph 300 illustrated in FIG. 3 is an example of a uni-partite graph (i.e., a graph in which all nodes are associated with the same entity, which in the case of FIG. 3 is a specific subscriber account). FIG. 4 illustrates an example sequence graph 400 that includes cycles. As illustrated, the sequence graph 400 comprises a plurality of nodes $402_1$-$402_n$ (hereinafter individually referred to as a "node 402" or collectively referred to as "nodes 402") and a plurality of edges $404_1$-$404_m$ (hereinafter individually referred to as an "edge 404" or collectively referred to as "edges 404") connecting the plurality of nodes 402. Each node 402 may represent an action performed on an entity (e.g., a subscriber account), while each edge 404 may represent whether the action was successful or failed. Each edge 404 may be directed to indicate a next action that may be performed depending upon whether a previous action was successful or failed.

In the example of FIG. 4, an action represented by a node 402 could be attempted multiple times before the action is successful. For instance, a user may fail to login into the subscriber account multiple times before logging in successfully (e.g., represented by node $402_1$ and edges $404_1$ and $404_6$). Similarly, a user may fail multiple times to add an authorized user to the subscriber account before giving up (e.g., as represented by node $402_2$ and edge $404_7$). As in FIG. 3, the bolded outline indicates the state at which fraud was identified in the sequence of activities.

Figure 5:
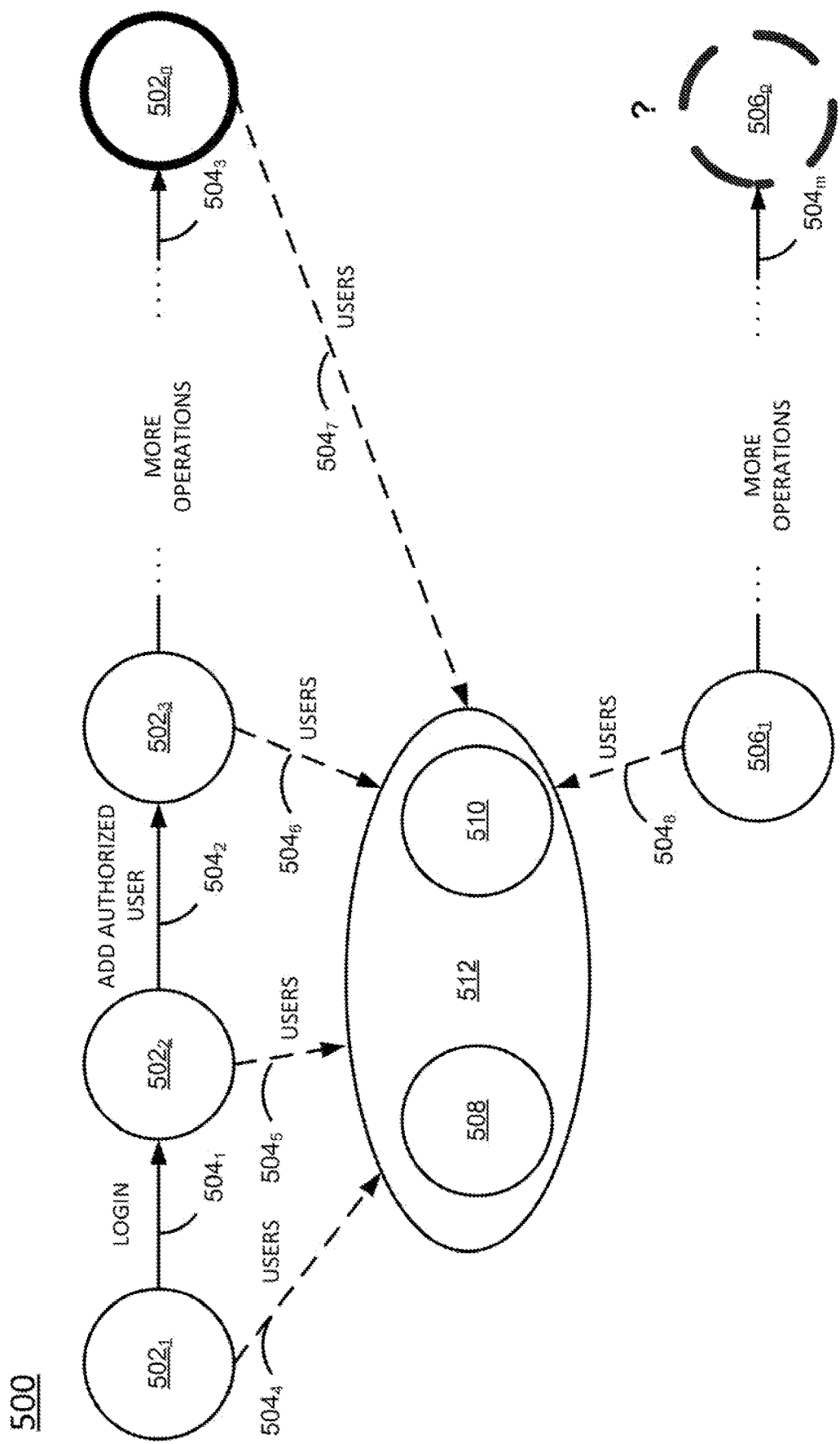
FIG. 5 illustrates an example multi-partite sequence graph that may be constructed to represent a series of activities.

In another example, the sequence graph constructed in step 204 may be a multi-partite graph. FIG. 5, for instance, illustrates an example multi-partite sequence graph 500 that may be constructed to represent a series of activities. As illustrated, the sequence graph 500 comprises a first plurality of nodes $502_1$-$502_n$ (hereinafter individually referred to as a "node 502" or collectively referred to as "nodes 502"), a second plurality of nodes $506_1$-$506_p$ (hereinafter individually referred to as a "node 506" or collectively referred to as "nodes 506"), a single node 508, a single node 510, and a plurality of edges $504_1$-$504_m$ (hereinafter individually referred to as an "edge 504" or collectively referred to as "edges 504") connecting the nodes 502, 506, 508, and 510.

Each node 502 in the first plurality of nodes may represent a state of a first subscriber account (with node $502_1$ representing the initial state of the first subscriber account), while each node 506 in the second plurality of nodes may represent a state of a second subscriber account (with node $506_1$ representing the initial state of the second subscriber account). Each edge 504 may represent an action that causes either the first subscriber account (if connecting nodes 502 of the first plurality of nodes) or the second subscriber account (if connecting nodes 506 of the second plurality of nodes) to transition from one state to the next. Each edge 504 may be directed to indicate the order in which the transition occurs. Additionally, in the example of FIG. 5, the node 508 may represent a social security number, while the node 510 may represent an email address. Collectively, the nodes 508 and 510 may comprise a subgraph 512 of an identity graph (i.e., a graph that represents known information about a subscriber).

The fact that both the first plurality of nodes 502 and the second plurality of nodes 506 connect to the subgraph 512 indicates that the first subscriber account and the second subscriber account are associated with the same social security number (indicated by node 508) and the same email address (indicated by node 510), but not with the same subscriber name. This may indicate that synthetic data is being used. Anything that is learned from the multi-partite sequence graph 500 for the sequence associated with the first subscriber account (represented by the first plurality of nodes 502) could be used to help identify whether the outcome of the sequence associated with the second subscriber account (represented by the second plurality of nodes 506) is fraudulent or not fraudulent.

Referring back to FIG. 2, in optional step 206 (illustrated in phantom), once the plurality of sequence graphs has been constructed, the processing system may generate graph embeddings for the plurality of sequence graphs. In one example, an embedding may convert an input sequence graph into a reduced-dimensionality vector form which can be more easily clustered (e.g., according to distance metrics) with other reduced-dimensionality vectors representing other sequence graphs. In one example, the embeddings may assist in unsupervised training of a machine learning model to discern between new activity sequences that indicate instances of threat activity and new activity sequences that indicate instances of non-threat activity. More particularly, the embeddings may help the machine learning model to learn to cluster new sequence graphs with historical sequence graphs whose embeddings are similar (where different clusters of sequence graphs may be associated with different types of threat or non-threat outcomes). This, in turn, may help the machine learning model to detect anomalies (i.e., activity sequences whose sequence graphs are so unique that similar sequence graphs with which the new sequence graphs can be clustered do not exist).

In one example, using a multi-partite graph to generate a graph embedding may allow the machine learning model to be trained simultaneously on the different parts of the graph to create a single overall embedding. This allows multiple contexts and/or vectors to be captured in a single vector space.

In optional step 208 (illustrated in phantom), the processing system may generate a plurality of labels for the plurality of sequence graphs. In one example, a label for a sequence graph may indicate whether the activity sequence depicted in the sequence graph has been confirmed to indicate an instance of threat activity or non-threat activity. These labels may assist in supervised training of a machine learning model to discern between new activity sequences that indicate instances of threat activity and new activity sequences that indicate instances of non-threat activity. More particularly, the labels may help the machine learning model to learn to predict when a new sequence graph is likely to culminate in a threat state or a non-threat state.

In step 210, the processing system may train the machine learning model to detect threat pathways, using the plurality of sequence graphs. The machine learning model may be trained using either the embeddings generated in step 206 (if unsupervised) or the labels generated in step 208 (if supervised). For instance, in one example, embeddings such as those discussed above may be used to train a neural network framework for anomaly detection (where anomalies may indicate possible threat activity). In another example, the embeddings may be used in forecasting models to detect deviations from expected behaviors (where the deviations may indicate possible threat activity). In one example, the machine learning model may comprise a neural network; however, in other examples, the machine learning model may comprise another type of machine learning model.

In step 212, the method 200 may end.

Figure 6:
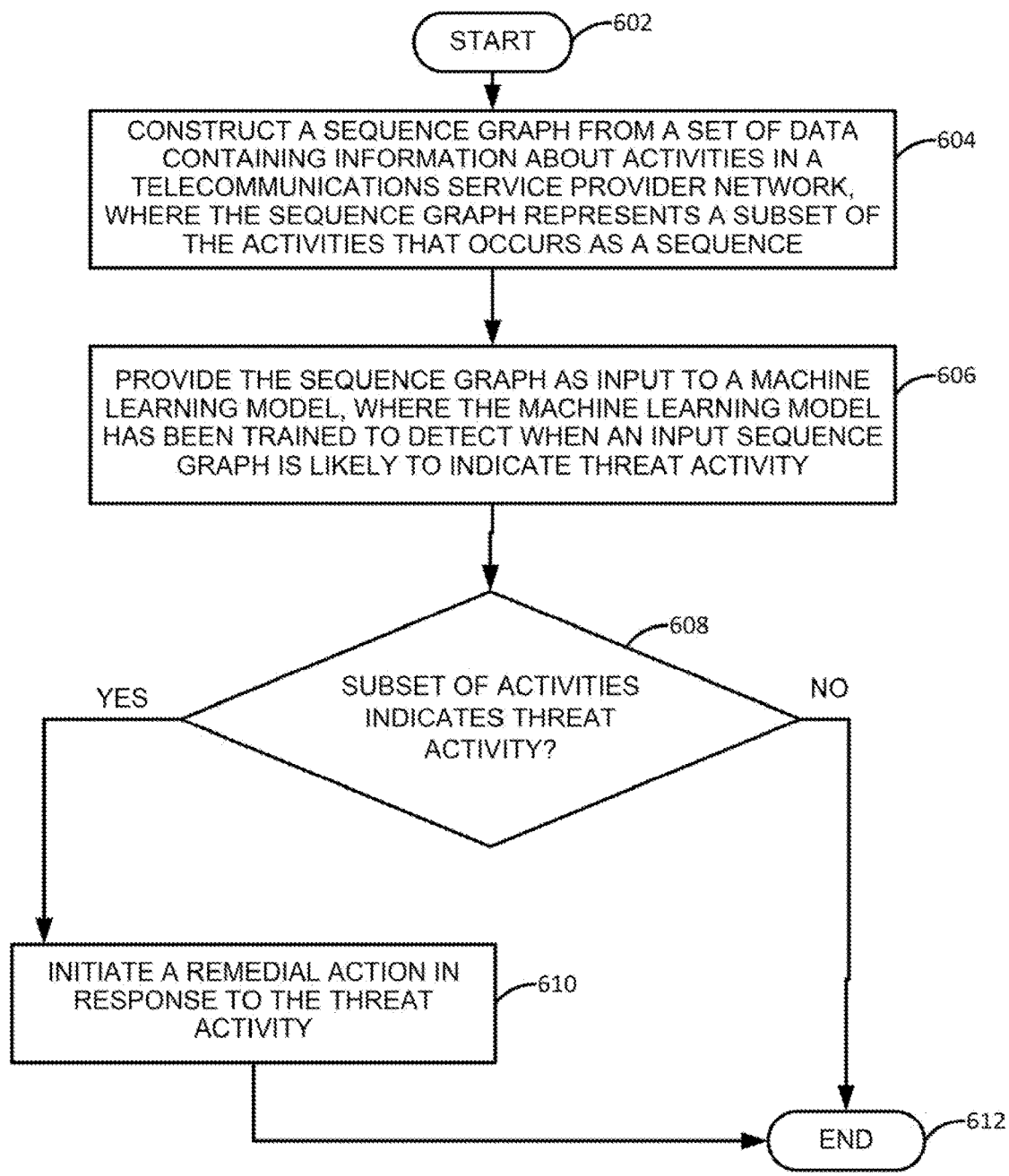
FIG. 6 illustrates a flowchart of an example method for detecting threat pathways using sequence graphs, in accordance with the present disclosure.

FIG. 6 illustrates a flowchart of an example method 600 for detecting threat pathways using sequence graphs, in accordance with the present disclosure. Specifically, the method 600 comprises a method for using a trained machine learning model to predict when a sequence of activities is likely to culminate in a threat. In one example, steps, functions and/or operations of the method 600 may be performed by a device as illustrated in FIG. 1, e.g., AS 104 or any one or more components thereof. In one example, the steps, functions, or operations of the method 600 may be performed by a computing device or system 700, and/or a processing system 702 as described in connection with FIG. 7 below. For instance, the computing device 700 may represent at least a portion of the AS 104 in accordance with the present disclosure. For illustrative purposes, the method 600 is described in greater detail below in connection with an example performed by a processing system, such as processing system 702.

The method 600 begins in step 602 and proceeds to step 604. In step 604, the processing system may construct a sequence graph from a set of data containing information about activities in a telecommunications service provider network, where the sequence graph represents a subset of the activities that occurs as a sequence (e.g., as a single transaction or as a set of state transitions of a single entity). For instance, the activities may comprise communications or transactions occurring between two or more devices in the telecommunications service provider network (e.g., between a domain name system router and a gateway, between a web server and a user endpoint device, between a database and a user endpoint device, etc.).

In another example, the sequence graph may be constructed from a set of data containing information about activities of a group of individuals. For example, the group of individuals comprises a plurality of subscribers of a telecommunications network service provider. However, in other examples, the group of individuals could comprise another group of individuals. For instance, the group of individuals could comprise a plurality of customers of a bank, a plurality of users of a social media or e-commerce web site, or the like.

In one example, the sequence graph may comprise a subset of the activities which are related (e.g., as part of a common transaction) and arranged in sequential order. Activities may be determined to be related, for instance, where the activities involve the same user (e.g., as identified by a user ID, an account number, an account login, an email address, a mobile phone number, or the like), the same device (e.g., as identified by an IP address, mobile subscriber number, or the like), or some other common parameters. For instance, a series of clicks on a web site, where each of the clicks originates with the same device within some defined window of time (e.g., x minutes, where X can be e.g., 2 minutes, 5 minutes, 15 minutes, etc.), may represent a single user session that can be represented as a sequence graph. In one example, the sequence graph may be constructed in a manner similar to any of the sequence graphs illustrated in FIGS. 3-5 (e.g., as a time series sequence graph, a sequence graph including cycles, as a uni-partite sequence graph, and/or as a multi-partite sequence graph).

In step 606, the processing system may provide the sequence graph (or an embedding of the sequence graph) as input to a machine learning model, where the machine learning model has been trained to detect when an input sequence graph (or an embedding of a sequence graph) is likely to indicate threat activity. In one example, the machine learning model may comprise a neural network-based model.

In one example, the sequence graph that is provided to the machine learning model may comprise a graph embedding of a sequence graph (i.e., a reduced-dimensionality vector form of the sequence graph), and the machine learning model may comprise an unsupervised model that attempts to cluster the graph embedding with known graph embeddings that are similar. In another example, the machine learning model may comprise a supervised model that estimates a likelihood, where the likelihood indicates a probability that the outcome of the sequence graph is indicative of threat activity. In this example, the machine learning model may rely on knowledge of historical sequence graphs whose outcomes are known to be either threats or not threats. For instance, the machine learning model may be trained to recognize when certain sequences of activities are likely to culminate in fraud.

In step 608, the processing system may determine, based on an output of the machine learning model, whether the subset of the activities (represented in the sequence graph) is indicative of threat activity. For instance, where the machine learning model is an unsupervised model that operates on graph embeddings as discussed above, the machine learning model may generate an output that indicates whether the sequence graph comprises an anomaly (e.g., a graph embedding that cannot be clustered due to lack of similar graph embeddings). In one example, any detected anomaly may automatically be assumed to represent a possible instance of a threat. In another example, where the machine learning model is a supervised model that estimates a likelihood of threat, the machine learning model may generate an output comprising a probability. Where the probability exceeds a predefined threshold, the subset of the activities represented in the sequence graph may be assumed to represent a possible instance of a threat.

If the processing system determines in step 608 that the subset of the activities represented in the sequence graph is not indicative of threat activity, then the method 600 may end in step 612. If, however, the processing system determines in step 608 that the subset of the activities represented in the sequence graph is indicative of threat activity, then the method 600 may proceed to step 610.

In step 610, the processing system may initiate a remedial action in response to the threat activity. In one example, the remedial action may comprise alerting a human analyst to the possible threat activity. For instance, an alert may be generated that indicates the entity (e.g., network device, subscriber account, file, etc.) affected by the threat activity, the detected activities that led to the determination that threat activity was likely, a degree of confidence associated with the determination that threat activity is likely (e.g., the likelihood computed by the machine learning model if supervised, or a distance between the graph embedding and a nearest cluster of graph embeddings if the machine learning model is unsupervised), and/or a request that the human analyst investigate the activities further.

In another example, the remedial action may comprise a proactive action taken by the processing system to stop or to mitigate the threat activity. For instance, if the threat activity affects a network device, such as a DNS server, the processing system may send an instruction to the device to temporarily shut down, to block specific ports, to block new queries coming from specific IP addresses, or the like.

The method 600 may then end in step 612.

It should be noted that the methods 200 and 600 may be expanded to include additional steps or may be modified to include additional operations with respect to the steps outlined above. In addition, although not specifically specified, one or more steps, functions, or operations of the methods 200 and 600 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIGS. 2 and 6 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Thus, the approaches disclosed herein allow for reliable detection of known threat pathways as well as emerging threat pathways, with a low rate of false positives. The low rate of false positives means that more resources can be devoted to mitigating actual instances of threat activity, allowing such instances of threat activity to be stopped and remediated in a timelier fashion that reduces overall damage and losses.

For instance, the approaches disclosed herein could be used to generate alerts when new mobile phone lines are added to an existing or newly opened mobile subscriber account. The approaches disclosed herein could also be used to generate alerts when risky customer support engagement patterns are detected (e.g., when the support engagement patterns may be combined with activities through other channels). This may allow service providers to blacklist or flag certain accounts for elevated risk of fraud, to discover and understand new fraud pathways, and/or to detect fraud vulnerabilities in sales channel pathways.

For instance, a telecommunications network service provider who incurs fraud losses through its digital sales channel may be able to catch twenty-five to thirty percent more instances of fraudulent transactions, which could allow the service provider to save as much as one million dollars per month depending on the amount of fraud incurred though the digital sales channel.

Additionally, the ability to detect emerging fraud pathways means that previously unidentifiable fraudulent activities can now be detected before these activities have the opportunity to inflict greater damage. For example, socially engineered fraud (e.g., pretexting, phishing, and the like) is often difficult to identify, but the disclosed approach may make it easier to detect such types of fraud relatively early on.

The approaches described herein may also have application in a variety of other fields. For instance, in addition to detecting fraudulent activities in service provider networks and channels, the same approach could be used to detect network equipment failures, to detect bottlenecks in network efficiency, to detect sources of network intrusions, to detect illegal or unauthorized file accesses, to detect fault in web site user interfaces, or the like.

For instance, in the case of network intrusion detection, the disclosed approach may be used to detect attack vectors that intruders may exploit to break into a network. In this case, a sequence graph may model a sequence of hosts traversed by a network packet (e.g., where each node of the sequence graph represents a host traversed by the network packet, and each edge represents a hop between two hosts). An unsupervised machine learning model may then be trained to detect anomalous behavior (e.g., network packets traversing unexpected hosts or sequences of hosts). When an anomalous behavior is detected, the source of the anomalous behavior may be identified, and remedial actions may be taken such as blocking access to certain ports or blacklisting the IP address of the source of the anomalous behavior. Another remedial action may comprise transparently re-routing the network packets to a "honeypot" host (at which the activities of the intruder can be observed without detection). Re-routing network packets to a honeypot may allow for observation of the anomalous behavior before taking more drastic remedial actions. For instance, observation may allow a processing system or a human analyst to determine whether the anomalous behavior is harmless or is an instance of a previously unobserved attack.

To detect illegal or unauthorized file accesses, the approach may be similar to the network intrusion detection example. However, in this case, the processing system is trying to understand what routes a perpetrator took to gain access to a specific file. In this case, a sequence graph may model a session of accesses (e.g., including secure shell (SSH) logins to a list of machines, accesses to databases, and/or accesses to file shares), such that the sequence graph as a whole represents the (potentially previously unknown) pathway to the file that was accessed. Thus, each node in the sequence graph may represent an access, and each edge in the sequence graph may represent whether the access succeeded or failed. In one example, information about accesses can be obtained from log files or other sources in order to construct the sequence graph. An unsupervised machine learning model may then be trained to detect anomalous behavior (e.g., accesses occurring in an unexpected order). When an anomalous behavior is detected, the source of the anomalous behavior may be identified, and remedial actions may be taken such as "plugging" the pathway associated with the anomalous behavior to eliminate the viability of the pathway as a means for unauthorized files access (e.g., so that subsequent accesses of the file via the pathway are disabled). In another example, the remedial action may include redirecting any access attempts that fall along the pathway associated with the anomalous behavior to a benign file on a honeypot machine. The activities of the party accessing the benign file may then be observed without detection (e.g., to see what the party does with the benign file).

To detect a fault in a web site user interface, a sequence graph may model a user session with the web site, where each node of the sequence graph may represent a link on which the user clicked, and each edge may represent an order in which the links were clicked. In this case, a supervised machine learning technique may be used to detect endpoints and/or actions that are associated with session termination (e.g., when the user leaves the web site or is required to log back into the web site). Detecting session termination events may help the processing system to detect when links are likely to be broken and/or when session persistence in the public-facing web site is likely to be broken. When a broken link or broken session persistence is detected, the remedial action may comprise issuing a work order (e.g., to fix the broken link and/or broken session persistence).

FIG. 7 depicts a high-level block diagram of a computing device or processing system specifically programmed to perform the functions described herein. As depicted in FIG. 7, the processing system 700 comprises one or more hardware processor elements 702 (e.g., a central processing unit (CPU), a microprocessor, or a multi-core processor), a memory 704 (e.g., random access memory (RAM) and/or read only memory (ROM)), a module 705 for detecting threat pathways using sequence graphs, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or 600 as discussed above is implemented in a distributed or parallel manner for a particular illustrative example, i.e., the steps of the above method 200 or 600 or the entire method 200 or 600 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 702 can also be configured or programmed to cause other devices to perform one or more operations as discussed above. In other words, the hardware processor 702 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200 or 600. In one example, instructions and data for the present module or process 705 for detecting threat pathways using sequence graphs (e.g., a software program comprising computer-executable instructions) can be loaded into memory 704 and executed by hardware processor element 702 to implement the steps, functions, or operations as discussed above in connection with the example method 200 or 600. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 705 for detecting threat pathways using sequence graphs (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
constructing, by a processing system including at least one data processor, a sequence graph from a set of data containing information about activities in a telecommunications service provider network, where the sequence graph represents a subset of the activities that occurs as a sequence, wherein the sequence graph comprises a plurality of nodes and a plurality of edges, wherein each node of the plurality of nodes represents a state of an entity in the telecommunications service provider network at a given time, and wherein each edge of the plurality of edges represents a transition of the entity from one state to another state;
providing, by the processing system, an embedding of the sequence graph as input to a machine learning model, wherein the machine learning model has been trained to detect when an input embedding of a sequence graph is likely to indicate a threat activity;
determining, by the processing system based on an output of the machine learning model, the subset of the activities is indicative of the threat activity; and
initiating, by the processing system, a remedial action to mitigate the threat activity.

2. The method of claim 1, wherein the entity comprises at least one of: a subscriber account, a file stored on a device in the telecommunications service provider network, a device in the telecommunications service provider network, or a web site.

3. The method of claim 2, wherein the remedial action comprises sending an instruction to lock the subscriber account.

4. The method of claim 2, wherein the remedial action comprises sending an instruction to implement a two-factor authentication code on the subscriber account.

5. The method of claim 2, wherein the remedial action comprises plugging a pathway used to access the file so that subsequent accesses of the file via the pathway are disabled.

6. The method of claim 2, wherein the remedial action comprises redirecting a subsequent attempt to access the file via the pathway to a benign file stored on a honeypot host.

7. The method of claim 6, wherein the remedial action further comprises observing activities of a party accessing the benign file.

8. The method of claim 2, wherein the remedial action comprises instructing the device to block a port of the device.

9. The method of claim 2, wherein the remedial action comprises instructing the device to block a requests from a specific internet protocol address.

10. The method of claim 2, wherein the remedial action comprises instructing the device to redirect requests received by the device to a honeypot host.

11. The method of claim 2, wherein the remedial action comprises issuing a work order to fix a broken link on the web site.

12. The method of claim 1, wherein the determining comprises detecting that the embedding of the sequence graph cannot be clustered with any clusters of embeddings of sequence graphs of historical activity sequences.

13. The method of claim 12, wherein the remedial action comprises alerting a human analyst to the threat activity.

14. The method of claim 13, wherein the alerting comprises indicating a likelihood that the threat activity is a genuine threat activity, and wherein the likelihood is computed as a distance between the embedding of the sequence graph and a cluster of the any clusters to which the embedding of the sequence graph is closest.

15. A non-transitory computer-readable medium storing instructions which, when executed by a processing system including at least one processor, cause the processing system to perform operations, the operations comprising:
constructing a sequence graph from a set of data containing information about activities in a telecommunications service provider network, where the sequence graph represents a subset of the activities that occurs as a sequence, wherein the sequence graph comprises a plurality of nodes and a plurality of edges, wherein each node of the plurality of nodes represents a state of an entity in the telecommunications service provider network at a given time, and wherein each edge of the plurality of edges represents a transition of the entity from one state to another state;
providing an embedding of the sequence graph as input to a machine learning model, wherein the machine learning model has been trained to detect when an input embedding of a sequence graph is likely to indicate a threat activity;
determining, based on an output of the machine learning model, the subset of the activities is indicative of the threat activity; and
initiating a remedial action to mitigate the threat activity.

16. The non-transitory computer-readable medium of claim 15, wherein the entity comprises at least one of: a subscriber account, a file stored on a device in the telecommunications service provider network, a device in the telecommunications service provider network, or a web site.

17. The non-transitory computer-readable medium of claim 16, wherein the remedial action comprises at least one of: sending an instruction to lock the subscriber account, sending an instruction to implement a two-factor authentication code on the subscriber account, plugging a pathway used to access the file so that subsequent accesses of the file via the pathway are disabled, redirecting a subsequent attempt to access the file via the pathway to a benign file stored on a honeypot host, instructing the device to block a port of the device, instructing the device to block a requests from a specific internet protocol address, instructing the device to redirect requests received by the device to a honeypot host, or issuing a work order to fix a broken link on the web site.

18. A device comprising:
   a processing system including at least one processor; and
   a non-transitory computer-readable medium storing instructions which, when executed by the processing system, cause the processing system to perform operations, the operations comprising:
   constructing a sequence graph from a set of data containing information about activities in a telecommunications service provider network, where the sequence graph represents a subset of the activities that occurs as a sequence, wherein the sequence graph comprises a plurality of nodes and a plurality of edges, wherein each node of the plurality of nodes represents a state of an entity in the telecommunications service provider network at a given time, and wherein each edge of the plurality of edges represents a transition of the entity from one state to another state;
   providing an embedding of the sequence graph as input to a machine learning model, wherein the machine learning model has been trained to detect when an input embedding of a sequence graph is likely to indicate a threat activity;
   determining, based on an output of the machine learning model, the subset of the activities is indicative of the threat activity; and
   initiating a remedial action to mitigate the threat activity.

19. The device of claim 18, wherein the entity comprises at least one of: a subscriber account, a file stored on a device in the telecommunications service provider network, a device in the telecommunications service provider network, or a web site.

20. The device of claim 19, wherein the remedial action comprises at least one of: sending an instruction to lock the subscriber account, sending an instruction to implement a two-factor authentication code on the subscriber account, plugging a pathway used to access the file so that subsequent accesses of the file via the pathway are disabled, redirecting a subsequent attempt to access the file via the pathway to a benign file stored on a honeypot host, instructing the device to block a port of the device, instructing the device to block a requests from a specific internet protocol address, instructing the device to redirect requests received by the device to a honeypot host, or issuing a work order to fix a broken link on the web site.

* * * * *